April 12, 1960     D. E. STINEBAUGH     2,932,813
ROAD SAFETY SIGNAL
Filed June 7, 1957        2 Sheets-Sheet 1
FIG. 1
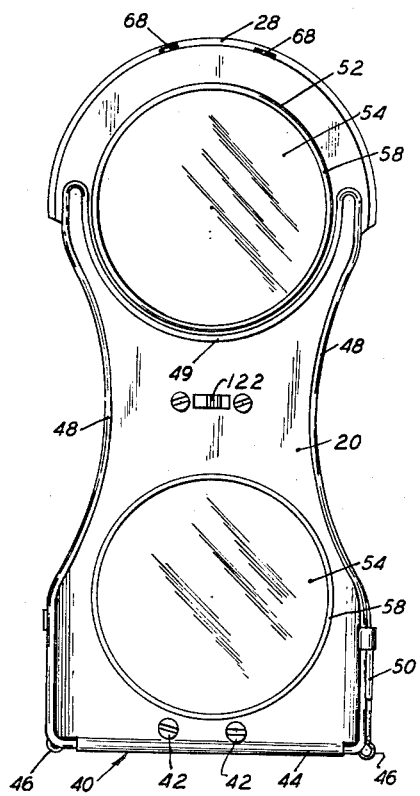
FIG. 2
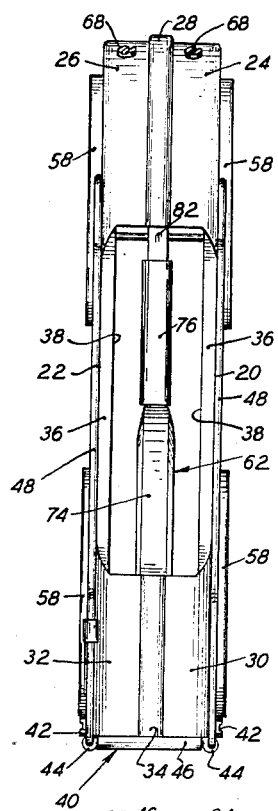
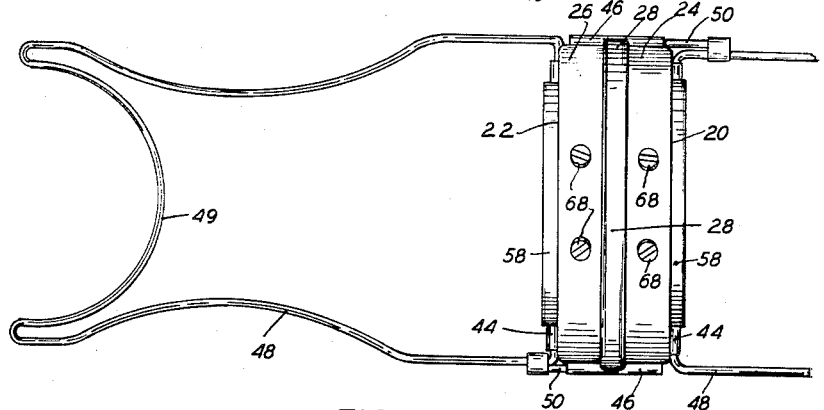
FIG. 3
INVENTOR.
DONALD E. STINEBAUGH
BY
BUCKHORN, CHEATHAM & BLORE
ATTORNEYS April 12, 1960  D. E. STINEBAUGH  2,932,813
ROAD SAFETY SIGNAL
Filed June 7, 1957  2 Sheets-Sheet 2
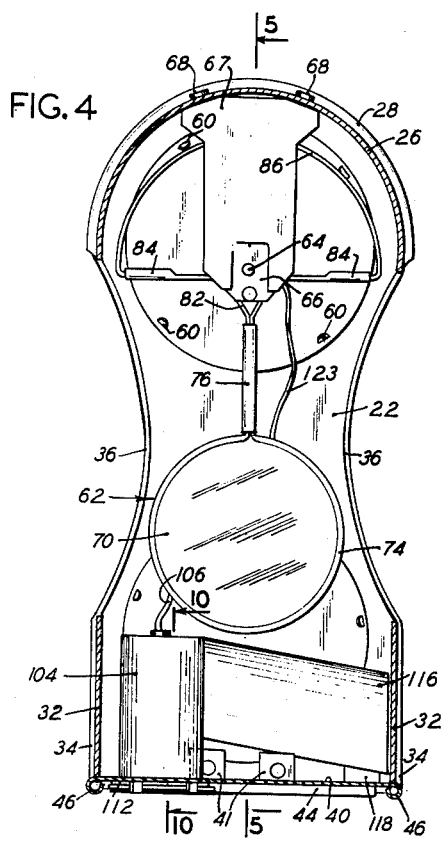
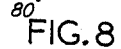
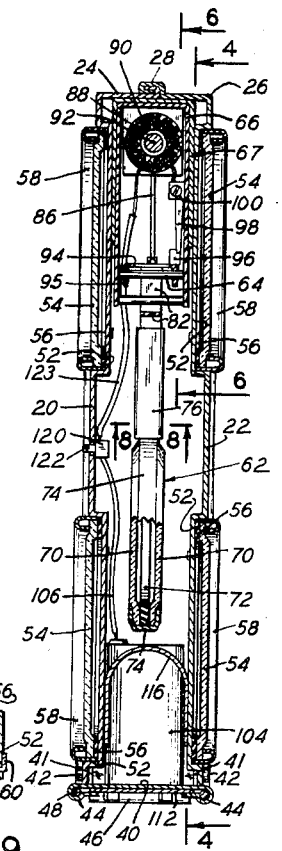
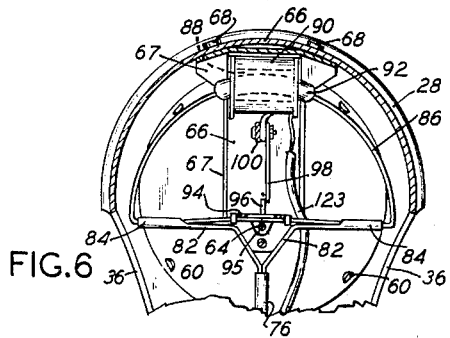
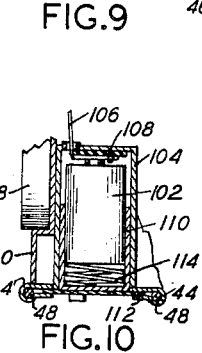
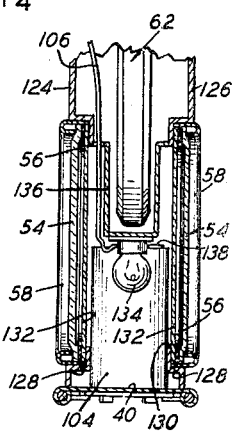
INVENTOR.
DONALD E. STINEBAUGH
BY
BUCKHORN, CHEATHAM & BLORE
ATTORNEYS

United States Patent Office 2,932,813
Patented Apr. 12, 1960

2,932,813

ROAD SAFETY SIGNAL

Donald E. Stinebaugh, Riverside, Calif., assignor to Gilbert Dahl, Elk River, Idaho Application June 7, 1957, Serial No. 664,309

5 Claims. (Cl. 340—49)

This invention relates to a road safety signal and more particularly to a device which is especially useful for providing roadside warnings and which can be carred by automobiles or trucks and which can be positioned near such automobile or truck when stopped by the roadside so as to provide an effective flashing signal which cannot fail to be observed by the drivers of other vehicles although the device also has other uses.

The signaling device of the present invention includes an oscillating signal member which is moved from side to side through a hollow casing so as to repeatedly appear on opposite sides of the casing in a manner which is extremely effective in attracting the attention of drivers of vehicles passing the warning signal. Such signal element as well as the entire device is preferably of a brilliant color, such as red, and the signal element is provided with reflecting members or lenses on both the front and rear surfaces thereof so as to reflect light from the headlights of passing vehicles. The passage of the signal member through the hollow casing between signaling position on opposite sides of such casing produces an effective flashing action when reflecting light from such headlights even though the signaling device contains no flashing light. That is to say, the reflecting elements of the moving signal element are hidden by the casing when passing therethrough but appear and disappear on opposite sides of the casing. The front and rear faces of the casing, which faces are directed toward the lights of passing vehicles, are also provided with stationary reflecting lenses or other reflecting elements and if desired, certain of such reflecting elements may also be employed as lenses for a flashing light. The movable signal member is preferably in the form of a pendulum with the reflecting elements constituting the pendulum weight and such pendulum may be driven by any suitable motor. The preferred motor is an electric motor of the solenoid type in which a magnetic core passes through a solenoid winding, the solenoid winding being energized from a small dry cell carried by the casing of the signal device through intermittently engaging contacts actuated by movement of the pendulum. The flashing light referred to may be in series with such contatcs such that a single pair of contacts serves to energize the solenoid for driving the pendulum and to cause flashing of the light.

It is therefore an object of the present invention to provide an improved roadway safety signal device in which an oscillating signal member is arranged to provide a flashing effect even though no flashing light is employed.

A further object of the invention is to provide a roadway safety signal device in which a reflecting signal member is caused to pass through a hollow casing between signaling positions on opposite sides of such casing in order to provide a flashing reflection from headlights of vehicles passing the signal.

A further object of the invention is to provide a roadway safety signal device in which a signaling member in the form of a pendulum having reflecting elements thereon is electrically driven and is mounted so as to produce a flashing effect by reflected light.

A still further object of the invention is to provide a roadway safety signal device having an oscillating signaling member electrically driven from batteries carried by the devices and in which contacts employed to energize the electric motor are also employed to complete a circuit through a flashing light.

Other objects and advantages of the invention will appear in the following description of a preferred embodiment thereof given in connection with the attached drawings of which:

Fig. 1 is a front elevation of device of the present invention with its ground engaging support members in folded position;

Fig. 2 is a side elevation of the device of Fig. 1;

Fig. 3 is a top view of the device of Figs. 1 and 2 showing the ground engaging support members in extended position, one such members being partly broken away;

Fig. 4 is a vertical section taken on the line 4—4 of Fig. 5;

Fig. 5 is a vertical section taken approximately on the line 5—5 of Fig. 4 with parts broken away;

Fig. 6 is a partial vertical section taken on the lines 6—6 of Fig. 5;

Fig. 7 is a bottom view of the device with the ground engaging support members in folded position;

Fig. 8 is a fragmentary horizontal section taken on the line 8—8 of Fig. 4;

Fig. 9 is a fragmentary vertical section illustrating the manner of securing the reflecting lenses to the casing of the device;

Fig. 10 is a fragmentary horizontal section taken on the line 10—10 of Fig. 4; and Fig. 11 is a partial vertical section of the lower portion of the device showing a modification thereof.

Referring more particularly to the drawings, the signal device of the present invention includes front and rear panel members 20 and 22 respectively. The panel members 20 and 22 have arcuate upper ends and inwardly directed arcuate flanges 24 and 26 (Fig. 5) respectively, the edges of the flanges 24 and 26 being interlocked in a seam 28. Similarly the side edges of the panel members 20 and 22 at their lower ends are provided with inwardly extending flanges 30 and 32 respectively (Fig. 2), having their edges interlocked to form a seam 34 which may be of the same type as seam 28. The panel members 20 and 22 are of generally hour-glass shape as shown most clearly in Figs. 1 and 4, and are spaced from each other by the upper flanges 24 and 26 and by lower flanges 30 and 32 to form a hollow casing. Narrow inwardly turned reinforcing flanges 36 (Fig. 2) extend generally vertically between the flanges 24 and 30 of the panel 20 and between the flanges 26 and 32 of the panel 22, to provide vertically elongated lateral openings 38 into the interior of the casing.

The casing thus far described has an opening in its lower end, which opening is closed by a bottom member 40 (Fig. 4) having upstanding tabs 41 struck upwardly therefrom and secured to the side panel members 20 and 22 by means of the screws 42 (Figs. 1 and 2). The bottom member 40 has front and rear edge portions rolled downwardly into tubes 44 open at their ends and side portions rolled downwardly into tubes 46 also open at their ends. Support members 48 formed of stiff wire and having the shape shown most clearly in Fig. 3, including arcuate portions 49, have their ends bent inwardly and inserted into tubes 44. The support members may be folded up against the surfaces of the panels 20 and 22 as shown most clearly in Figs. 1 and 2. The support members 48 may also be pivoted down into the position shown in Fig. 3 so that they extend horizontally to the front and rear respectively of the casing of the signal device. Each of the support members 48 has a pin 50 slidably secured to a straight portion thereof adjacent the casing of the device. The pin is positioned so as to be parallel with such straight portion and, when the support members 48 are in the position shown in Fig. 3, the pins 50 may be slidably inserted into the ends of the tubes 46 so as to lock the support members 48 in supporting position, i.e., in a position extending horizontally from the bottom of the front and rear panel members 20 and 22.

The panel members 20 and 22 have upper and lower circular recesses 52 (Fig. 5) formed in their outer surfaces for the reception of reflector elements 54. The reflector elements 54 are preferably of glass or transparent plastic material and may be of any known or suitable type. Reflector elements which are particularly suitable are of transparent red plastic material having their rear surfaces formed with a plurality of small closely adjacent depressions each of which has the form of one corner of a cube, i.e., has three square faces at right angles to each other and of equal size. Such reflector elements depend for their action upon total reflection from rear surfaces in contact with air and extending at an acute angle to the direction of the received light. Any water in contact with the rear surfaces of the reflector elements destroys their effectiveness. The reflector elements are therefore each preferably backed by a resilient gasket element 56 (Fig. 9) positioned between the back surface of the rim of a reflector element 54 and the bottom of the corresponding recesses 52. The reflector elements 54 are held within the recesses by metal rim members 58 having a return portion engaging the outer surface of the rims of the reflector elements and an inner peripheral portion engaging the bottoms of the recesses 52. The rim members 58 have stake or tab portions 60 on their inner peripheral portions, the tab portions extending through apertures in the panel members 20 and 22. The tabs 60 are bent over to retain the rim members against the reflector elements 54 and press such reflector elements against the gaskets 56. This structure seals the back surfaces of the reflector elements. In the structure shown, the casing of the device is provided with four stationary reflector elements which are preferably bright red in color and which reflect red light from headlights of vehicles passing the signal back toward such vehicles when the signal is positioned on or by a road with the outer faces of the panel members 20 and 22 facing traffic.

An oscillating signal member 62 (Figs. 4 and 5) is provided in the form of a pendulum pivotally supported by means of a cross shaft 64 journalled in an inner member 66 of a housing of an oscillating motor device, the outer member 67 of such housing being secured in the upper end of the casing formed by the panel members 20 and 22. The oscillating signal member 62 has at its lower end a pair of reflector elements 70 which may be of the same type as the reflector elements 54 previously described. The reflector elements 70 are positioned back to back with a gasket 72 between their rims. The rims of the reflector elements 72 are surrounded by a sheet metal band 74 having edge flanges formed inwardly at an obtuse angle with respect to the body of the band so that the reflector elements are forced together to compress the gasket and make a water-tight seal between the reflector elements 70 when the band is tightened around the reflector elements. The pendulum rod or bar 76 is preferably formed integrally with the metal band 74 which surrounds the reflector element 70. Such rod is shown in enlarged cross section in Fig. 8 and is formed by flattening a continuation 78 of the flanges on one extension of the metal band 74 against the body of the band and crimping a continuation 80 of another extension of the metal band about the first mentioned extension. This crimping action draws the band 74 tightly around the reflector elements 70.

The upper ends 82 (Fig. 6) of the extensions of the band forming the pendulum rod 76 are spread laterally so as to be inclined upwardly and outwardly and are then further bent so as to extend outwardly and substantially horizontally. The extreme ends of the band terminate in horizontal portions having upstanding tabs 84 bent inwardly over the ends of an arcuate member 86 which, as shown in Fig. 6, extends upwardly and lies in a vertical plane also extending laterally of the device, the ends of the member 86 being bent inwardly so as to lie in said plane and be positioned horizontally. The arcuate member 86 has its arcuate portion concentric with the pivot shaft 64 and forms a part of an oscillating electric motor for causing the pendulum signal device 62 to oscillate. The arcuate member 86 extends through a bore 88 in a solenoid coil 90 and has a magnetic core 92 centrally positioned thereon, the coil 90 being secured in the upper portion of the casing 66 of the motor.

A cross plate 94 has narrow end portions also received within the inwardly bent tabs 84 of the upper ends of the strap 74 of the pendulum rod 76. The plate 94 also having down turned tabs 95 at its side edges in which the cross shaft 64 for the pendulum signal element is secured. The plate 94 also has secured thereto an upstanding contact element 96 positioned to have its upper end portion intermittently contact a downwardly extending spring contact element 98 secured to an inwardly extending tab 100 on one side of the member 66 of the motor casing, the contact element 98 being insulated from the tab 100.

A dry cell 102 (Fig. 8) is provided for energizing the scoillating motor. The dry cell 102 is contained within a tubular casing 104 extending upwardly from the bottom member 40 and having a closed top except for an opening through which a wire 106 extends from a contact member 108 insulated from the top of the casing 104. The battery 102 is positioned within a telescoping tubular member 110 having a closed lower end and laterally extending locking tabs 112 (Fig. 7) secured to its outer lower surface, the tabs 112 engaging under straightened portions of the tubular edge portions 44 of the bottom member 40. A spring 114 positioned in the bottom of the telescoping member 110 urges the cell 102 against the contact member 108, the spring 114 making contact with the bottom of the cell 102. By inserting the telescoping member 110 containing the cell 102 into the casing 104 and rotating it so as to engage tabs 112 beneath the straightened portions of the tubular elements 44, the cell 102 is held in position in the casing 104. An arcuate reinforcing and cover member 116 (Fig. 4) may have one end secured to the casing 104 for the cell 102 and its other end secured to upstanding tabs 118 carried by the bottom member 40.

A switch 120 is secured to the inside of the front panel member 20 at its mid-portion and has an operating element 122 extending to the exposed surface of the panel member 22 through a suitable aperture. The wire 106 from the battery casing 104 is connected to one terminal of the switch 120 and the other terminal of the switch is connected through a wire 123 to one terminal of the solenoid coil 90, the other terminal of the solenoid coil being connected to the vertically extending spring contact member 98. When the switch 120 is closed and the contact elements 96 and 98 are in contact, a circuit is closed from a ground connection to the casing provided by the spring 114 through the cell 102, wire 106, switch 120, wire 124, solenoid coil 90, and contact elements 98 to another ground connection to the casing provided by the contact element 96. The arrangement of the contacts 98 and 96 is such that when the pendulum signal device is oscillating, the circuit is closed as the core 92 is moving into the solenoid coil 90 from either direction and broken before the core 92 reaches approximately mid-position in the solenoid coil 90. Thus, when the circuit is completed through the switch 120 and the pendulum signal device is started by giving it an initial oscillating motion, the motor including the contact elements, the solenoid coil 90 and the core 92 functions to maintain the oscillating motion.

The operation of the device thus far described is believed apparent from above description thereof. When the device is not being used, the switch 120 is actuated to open position to open the motor circuit and the support members 48 are folded up against the side panels 20 and 22 as shown in Figs. 1 and 2. It is to be noted that the arcuate portions 49 of the support members 48 frictionally engage the rim members 58 for the reflector elements 54 to hold the support members in folded position. When it is desired to employ the signal, the support members 48 are moved into the position indicated in Fig. 3 and the pins 50 are inserted into the tubular members 46 to lock the support members 48 in their horizontal position extending to the front and rear of the device. The device then may be placed upon the ground or other supporting surface so that the support members 48 extend in the direction of traffic. The switch is actuated to complete the circuit through the solenoid coil 90 when the contact elements 96 and 98 are in contact with each other. By giving the pendulum signal device an initial swing, the electric motor above described continues the resulting oscillating motion of the pendulum signal device. In daylight hours, the oscillating signal device passes through the hollow casing so that it appears and disappears at opposite sides of the casing. This effectively attracts the attention of drivers of vehicles passing the signal. After dark, in addition to the reflections from the stationary reflecting members 54, the reflecting members 70 on the oscillating pendulum pass through the casing to thereby produce a flashing effective even though no flashing light is provided. Reflector elements of the type above described give an extremely brilliant reflection so that an effective warning is provided. Energy is drawn from the flashlight cell during a small fraction of the time the device is in operation and a single flashlight cell is sufficient to operate the signaling device for many hours. Also, the shelf or storage life of modern flashlight cells is such that replacement of the cells is necessary only at long intervals.

As shown in the modified structure of Fig. 11, an actual flashing light can also be provided, if desired, by a modification of the structure above described. Modified front and rear panels 124 and 126 may be employed, such panels being provided with lower reflector element receiving recesses 128 each having the central portions removed to form apertures 130 opening into the interior of the casing. In addition to a reflector element 54, gasket 56 and rim member 58, each recess may also contain a disc 132 of transparent material positioned between the gasket 56 and the bottom of the recess. The gasket 56 provides a sealing element between the disc 134 and the reflecting element 54. The transparent disc enables transmission of light through the reflector elements 54 from the interior of the casing. A small electric lamp 134 may be positioned within the casing and may be supported in a socket secured to a saddle shaped member 136 extending between the panel members 124 and 126 and having a downwardly extending mid-portion supporting the socket for the lamp 134. The lamp 134 may be connected in series with the motor including the solenoid coil 90. Two flashlight cells may be employed and, to contain such cells, a pair of upwardly extending casings 104, each similar to the casing 104 of Fig. 8, may be provided at opposite sides of the device, one of such casings being shown in Fig. 11. Each of the casings 104 may have a flashlight cell therein and the cells may be connected in series, the wire 138 leading from such cells to one terminal of the lamp socket 134. The other terminal of the lamp socket may be connected to the wire 106 leading to the switch 120 which may be the same as the switch shown in Fig. 5.

The lamp 134 may be of any suitable type of small flashlight lamp capable of being energized by a single flashlight cell. The effect is that most of the energy from one of the flashlight cells is utilized by the lamp 134 and most of the energy from the other cell is utilized in driving the oscillating motor above described. It will be apparent that the lamp 134 will light each time contact is made between the contact elements 96 and 98 such that the lamp 134 flashes twice for each complete oscillation of the pendulum signal element containing the reflector element 70. Although the reflector elements 54 provides substantially complete total reflection of light reaching such elements in a direction substantially normal to the outer surface of the elements, a substantial portion of the light from the lamp 134 reaching the rear surface of the lower reflector elements 54 is transmitted therethrough and an effective flashing light signal is also produced in addition to reflection of light from the stationary reflecting elements 54 and the moving reflecting element 70.

I claim:

1. A road safety signal comprising an elongated hollow casing, a bottom portion at one end of said casing adapted to rest on a supporting surface for holding said casing in an upright position and a top portion at the other end of said casing, said casing having laterally aligned side openings intermediate its height, a signal member supported in said casing for oscillating movement laterally through said casing and through said openings between signalling positions outside said casing and on opposite sides of said casing, reflecting members carried by said signal member for reflecting light when said signal member is in said signalling position, said reflecting members being concealed within said casing when said signal member is between said signalling positions and motor means for causing oscillating movement of said signal member through said casing between said positions.

2. A road safety signal comprising an elongated hollow casing including spaced front and rear portions providing outer face portions, a base portion at one end of said casing adapted to rest on a supporting surface for holding said casing in an upright position and a top portion at the other end of said casing, light reflecting members mounted on said panel portions for reflecting light from external sources directed towards said face portions, said casing having laterally aligned side openings intermediate its height and adjacent the lateral edges of said front and rear portions, a signal member supported in said casing for oscillating movement laterally through said openings and through said casing between signalling positions outside said casings and on opposite sides thereof, light reflecting members carried by said signal member for reflecting light from said sources when said signal member is in said signalling positions, electric motor means including intermittently closed contacts for actuating said means for causing oscillating movement of said signal member through said casing between said positions, the last mentioned light reflecting members being concealed within said casing when said signal is between said signalling positions, an electric lamp and a source of electric energy connected in series with said contacts, certain of said reflecting members on said panels being positioned to transmit light from said lamp to provide a flashing signal.

3. A road safety signal comprising an elongated hollow casing including spaced apposed panel portions providing outer face portions, a base portion at one end of said casing including a base portion adapted to rest on a supporting surface for holding said casing in an upright position and a top portion at the other end of said casing, light reflecting members mounted on said panel portions for reflecting light from external sources directed towards said face portions, said casing having laterally aligned side openings intermediate its height and adjacent the lateral edges of said panel portions, a pendulum signal member pivotally supported in the upper portion of said casing for oscillating movement laterally through said openings and through said casing between signalling positions outside said casing and on opposite sides thereof, light reflecting members carried by said signal member for reflecting light from said sources when said signal member is in said signalling positions, electric motor means including intermittently closed contacts for actuating said means for causing oscillating movement of said signal member through said casing between said signalling positions, the last mentioned light reflecting members being concealed within said casing when said signal is between said signalling positions, an electric lamp and a source of electric energy connected in series with said contacts, certain of said reflecting members on said panels being positioned to transmit light from said lamp to provide a flashing signal.

4. A road safety signal comprising an elongated hollow casing including spaced apposed panel portions providing outer face portions, a base portion at one end of said casing adapted to rest on a supporting surface for holding said casing in an upright position and a top portion at the other end of said casing, light reflecting members mounted on said panel portions for reflecting light from external sources directed towards said face portions, said casing having laterally aligned side openings intermediate its height and adjacent the lateral edges of said panel portions, a pendulum signal member pivotally supported in the upper portion of said casing for oscillating movement laterally through said openings and through said casing between signalling positions outside said casing and on opposite sides thereof, light reflecting members carried by said signal member for reflecting light from said sources when said signal member is in said signaling positions, the last mentioned light reflecting members being concealed within said casing when said signal is between said signalling positions, motor means for causing oscillating movement of said signal member through said casing between said positions, said base portion including a pair of folding support members pivotally secured to the bottom portion of said casing and separately movable between positions parallel to the front and rear portions of said casing to a horizontally extending support position, and means for locking said support members in support position.

5. A road safety signal comprising an elongated hollow casing, a bottom portion at one end of said casing including a pair of folding support members of stiff metal wire having a pivotal connection with said bottom portion and adapted to rest on a supporting surface for holding said casing in an upright position, said bottom portion having tubular members at the front and rear thereof and said wire having ends extending into opposite ends of said tubular members to form said pivotal connection, said support members being foldable against the front and rear surfaces of said casing, and a top portion at the other end of said casing, said casing having laterally aligned side openings intermediate its height, a signal member supported in said casing for oscillating movement laterally through said casing and through said openings between signalling positions outside said casing and on opposite sides of said casing, reflecting members carried by said signal member for reflecting light when said signal member is in said signalling positions, said reflecting members being concealed within said casing when said signal member is between said signalling positions and motor means for causing oscillating movement of said signal member through said casing between said positions.

References Cited in the file of this patent
UNITED STATES PATENTS

| | | |
|---|---|---|
| 1,231,847 | Carson | July 3, 1917 |
| 1,390,094 | Davis | Sept. 6, 1921 |
| 1,955,966 | Kingsley | Apr. 24, 1934 |
| 2,115,271 | LaLonde | Apr. 26, 1938 |
| 2,481,444 | Pierrez | Sept. 6, 1949 |
| 2,604,523 | Grissinger | July 23, 1952 |
| 2,650,355 | Pieczonka | Aug. 25, 1953 |